US012034637B1

(12) United States Patent
Papirakis et al.

(10) Patent No.: US 12,034,637 B1
(45) Date of Patent: Jul. 9, 2024

(54) NETWORK DEVICES FOR STATEFUL TRANSMISSION OF NETWORK TRAFFIC

(71) Applicant: Amazon Technologies, Inc., Seattle, WA (US)

(72) Inventors: Emmanuel Papirakis, Bothell, WA (US); Cameron Jared Bytheway, Seattle, WA (US); Matthias Einwag, North Vancouver (CA); Yashwanth Yadavalli, Seattle, WA (US); Yuchao Li, Seattle, WA (US); Jorge Peixoto Vasquez, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 17/643,799

(22) Filed: Dec. 10, 2021

(51) Int. Cl.
*H04L 45/74* (2022.01)
*H04L 9/00* (2022.01)
*H04L 9/40* (2022.01)
*H04L 47/125* (2022.01)
*H04L 67/1004* (2022.01)
*H04L 69/22* (2022.01)

(52) U.S. Cl.
CPC .......... *H04L 45/74* (2013.01); *H04L 47/125* (2013.01); *H04L 63/0428* (2013.01); *H04L 63/06* (2013.01); *H04L 63/0876* (2013.01)

(58) Field of Classification Search
None
See application file for complete search history.

(56) References Cited

U.S. PATENT DOCUMENTS

| 8,228,896 | B2* | 7/2012 | Smith | H04L 63/123 370/351 |
| 2012/0233349 | A1* | 9/2012 | Aybay | H04L 47/2441 709/234 |
| 2013/0159503 | A1* | 6/2013 | Erman | H04W 12/106 709/224 |
| 2016/0366108 | A1* | 12/2016 | Kamble | H04L 63/10 |
| 2019/0028382 | A1* | 1/2019 | Kommula | H04L 45/125 |
| 2019/0182337 | A1* | 6/2019 | Chittaro | H04L 67/146 |
| 2020/0351090 | A1* | 11/2020 | Gardner | H04L 9/3247 |
| 2021/0126864 | A1* | 4/2021 | Indiresan | H04L 43/026 |
| 2021/0185059 | A1* | 6/2021 | Achleitner | G06F 16/355 |
| 2022/0052957 | A1* | 2/2022 | Sloane | H04L 9/085 |
| 2023/0283588 | A1* | 9/2023 | Xu | H04L 63/123 709/245 |

* cited by examiner

*Primary Examiner* — Duc T Duong
(74) *Attorney, Agent, or Firm* — Knobbe Martens Olson & Bear LLP

(57) ABSTRACT

Systems and methods are provided to use a signed connection identifier to route packets of network traffic. Each network host can include a network device that independently routes the packets of network traffic without sharing state information with other network devices. A network device can receive a packet of network traffic and determine if the packet of network traffic includes a signed connection identifier. If the packet does not include a signed connection identifier, the network device can perform a load balancing operation to select a network host for the packet and generate a signed connection identifier for the packet identifying the selected network host. If the packet does include a signed connection identifier, the network device can encapsulate the packet and route the packet to a particular network host based on the signed connection identifier.

20 Claims, 7 Drawing Sheets

NETWORK DEVICES FOR STATEFUL TRANSMISSION OF NETWORK TRAFFIC

BACKGROUND

Network-based computing, in general, is an approach to providing access to information technology resources (e.g., computing resources) through services, such as Web services, where the hardware and/or software used to support those services is dynamically scalable to meet the needs of the services at any time. Companies and organizations operate computer networks that interconnect a number of computing devices to support operations or to provide those services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

In network-based computing, locations in which computing resources may be hosted and/or partitioned may be described as regions and/or availability zones. Each region may be a separate geographic area from other regions and can include multiple, isolated availability zones. The computing resources in a particular region and/or availability zone may be hosted by a network host. The network host may route packets of network traffic from a computing device to a computing resource. Packets may be small amounts of data that are passed to a particular network location.

Computing devices can utilize network-based computing to exchange data with the computing resources. Over the course of communications between a computing device and an application, the address and/or location of the computing device may change and the computing device may exchange data with a different network host and/or a different computing resource. It can be advantageous to reroute the communications to enable the computing device to communicate with the same network host and the same computing resource to prevent data loss and other inefficiencies.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
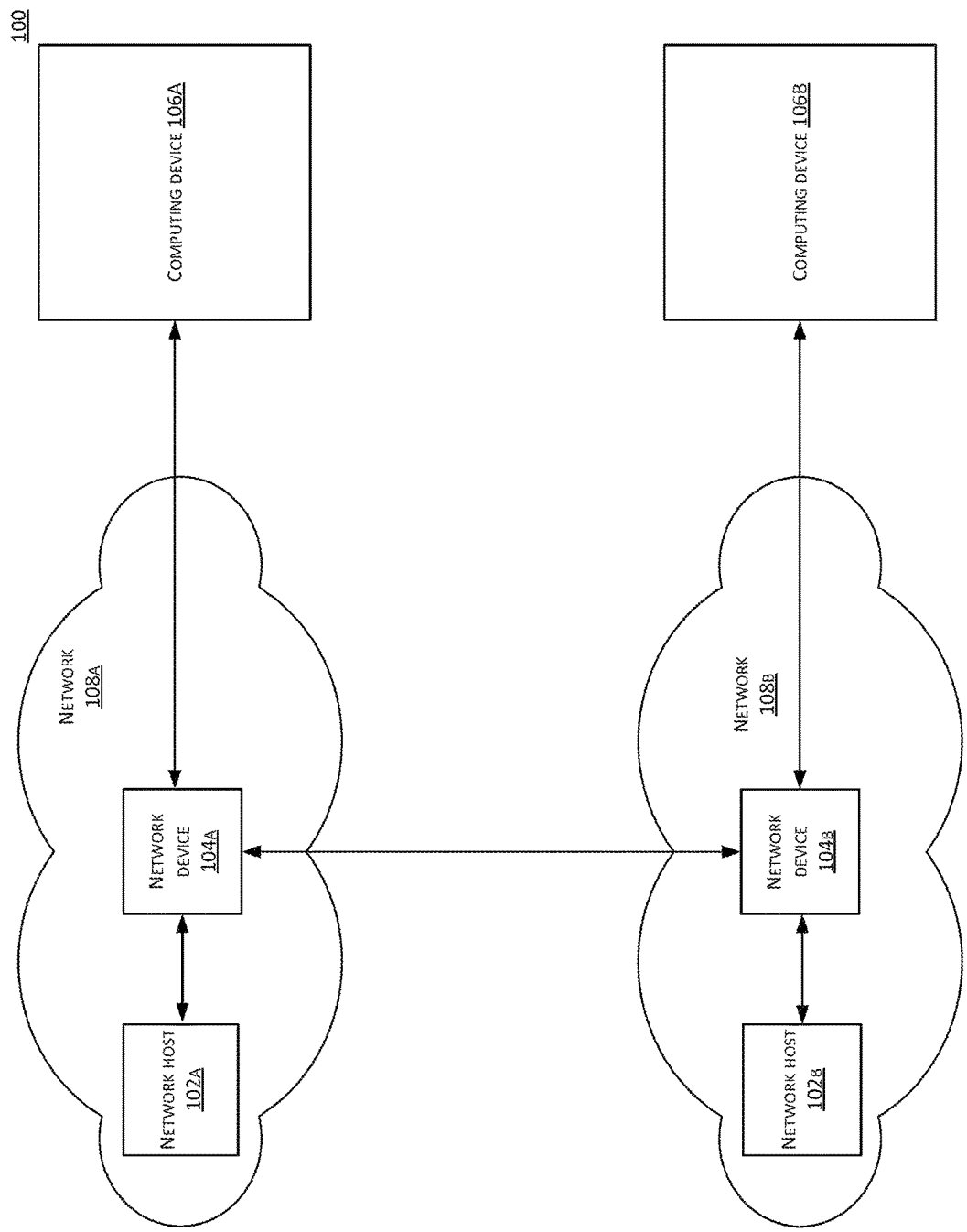
FIG. 1 depicts a schematic diagram of an example networked environment according to some embodiments.

The present disclosure generally relates to computer networking. More specifically, aspects of the present disclosure are directed to providing load-balanced access to a pool of computing resources spread across multiple geographic locations, using one or more network devices. The pool of computing resources may be scalable and fault-resistant. For example, the pool of computing resources may be horizontally scalable. The pool of computing resources can perform actions such as security inspection, compliance, policy controls, and/or other services. In some embodiments, the pool of computing resources may be referred to as a pool of applications, a pool of worker nodes, etc. As described in detail herein, the one or more network devices may provide a stateful routing service enabling users to submit network traffic to the same computing resource regardless of the location and/or the address of the user. Users, via a user computing device, may provide network traffic. For example, a user may provide packets of network traffic that include data to be passed to a particular location. The user may designate one or more operations for the packet of network traffic. For example, the user may designate one or more operations to be performed by the computing resources on the packet of network traffic.

As discussed above, the pool of computing resources can be distributed across multiple geographic locations. Further, the pool of computing resources can be distributed across multiple networks. Each of the multiple networks may be associated with a particular network host and a particular network device (e.g., a router, a load-balancer, etc.). The network device and the network host may make it easy for customers of a cloud provider network to access the computing resources in a safe and secure manner. For example, each of the network devices may manage the network traffic received from computing devices and may further manage access to the network host. The network devices may be inserted inline such that traffic flowing from a source and designated for a particular network host flows through the network device. As network traffic is received, the network device may load balance the traffic across the network hosts to ensure that particular network hosts do not become overloaded.

Further, the network device may further manage access to a subset of the pool of computing resources. For example, the network device may perform load balancing to distribute network traffic across the subset of the pool of computing resources. As network traffic is received, the network device may load balance the traffic to ensure that one or more of the computing resources does not become overloaded. For example, a network device can receive the network traffic, perform load balancing, and route the network traffic to a particular network host based on the load balancing. Further, the network device can receive network traffic from a network host, perform load balancing, and route the network traffic to a particular computing resource based on the load balancing. Therefore, the network traffic can be distributed across network hosts and can be distributed across the pool of computing resources. The network device may map a particular flow of network traffic (e.g., network traffic associated with a particular source) to a particular network host and/or a particular computing resource. The network device may map parameters identifying the connection to a particular computing resource. For example, the parameters may define a tuple (e.g., a group of parameters) associated with the network traffic. Further, the tuple may identify particular parameters from a packet of the network traffic. For example, a 4-tuple may identify a source address, a destination address, a source port, and a destination port. It will be understood that the tuple may include more, less, or different parameters from the packet of network traffic. The network device can map the particular tuple to a particular computing resource. Therefore, a network device can maintain a connection between a flow of network traffic and a particular computing resource. As additional network traffic is received (corresponding to different flows of network traffic), the network device can load balance the additional network traffic across the network hosts and/or across the pool of computing resources.

The packets of network traffic may further include a connection identifier identifying particular packets of traffic and a desired destination of the packets. For example, the connection identifier may identify where to send a particular packet of network traffic.

As noted above, one issue that may be of particular concern in computer networking is that of maintaining a stateful connection between a computing device and a particular computing resource as users may wish to retain a connection with a particular computing resource when changing addresses. For example, movement of a user may cause the internet protocol ("IP") address of a computing device associated with the user to change (e.g., as the computing device connects to a different network). As the IP address of the computing device changes, the flow of network traffic associated with the particular computing device may also change. For example, a 4-tuple that is based on a source address, a destination address, a source port, and a destination port may change in response to an updated IP address of the computing device (e.g., an updated source address). Therefore, a network device receiving network traffic from the computing device may not recognize the flow of network traffic (e.g., using the 4-tuple) and may load balance the network traffic. Further, the network device may route the network traffic to a different network and/or a different computing resource. As the network traffic may be handled by different networks and/or different computing resources, state information associated with the computing device may not be maintained. For example, the state information may be generated as the computing device provides network traffic to a particular computing resource. For example, the computing resource may receive the network traffic and, based on one or more actions taken relative to the network traffic, the computing resource may generate state information. As the computing device provides network traffic to a different computing resource, the state information generated based on providing the network traffic to the original computing resource may not be maintained and may not be provided to the new computing resource. Such a loss of state information can result in inefficiencies. Therefore, a user may wish to maintain a connection with a particular network and/or a particular computing resource.

As discussed above, in some embodiments, the packets of network traffic may include connection identifiers identifying a destination of the packet. However, as the connection identifier may not be secure and/or validated, the security of the network traffic may not be maintained and the network traffic may be exposed. Therefore, routing network traffic to different networks and/or different computing resources can lead to inadequate user experiences as the network traffic and/or related state information may be exposed. Further, the user may be unable to cause computing resources to iteratively execute operations using state information generated by other computing resources. Instead, each computing resource may be executed without state information generated by a computing resource previously associated with a flow of network traffic and a loss of data and/or additional inefficiencies may occur.

Embodiments of the present disclosure address these problems by enabling a stateless network device to perform a stateful transmission of network traffic across a pool of network hosts and a pool of computing resources. The stateful transmission of network traffic may enable packets to be sent to a particular network host and/or a particular computing resource without regard to a flow of network traffic associated with the network traffic. Such a stateful transmission of network traffic retains the advantages offered by traditional network devices by enabling network traffic to be load balanced across a pool of network hosts and/or a pool of computing resources. Further, the stateful transmission of network traffic by a stateless network device can reduce or eliminate performance and efficiency issues, for example, due to a loss of state information. More specifically, embodiments of the present disclosure enable an association between a particular computing device and a particular computing resource to be maintained without regard to the flow of network traffic. Further, where packets of network traffic include a connection identifier, embodiments of the present disclosure enable the integrity and authenticity of the connection identifier to be verified.

Each packet of network traffic may include a connection identifier. The connection identifier may identify a particular network host and a particular computing resource (e.g., a worker) for the particular packet. Based on receiving a packet of network traffic, a network device can identify the connection identifier and route the packet to a particular network host identified by the connection identifier and/or a particular computing resource identified by the connection identifier. Further, the network device can identify packets of network traffic that do not include a connection identifier and perform load balancing to distribute the packets across a pool of network hosts and/or a pool of computing resources. Based on identifying that a particular packet does not include a connection identifier, the network device can generate a connection identifier for the particular packet. Further, the network device may include the connection identifier within the packet (e.g., the header of the packet). The network device may communicate the connection identifier to the computing device for inclusion in subsequent packets of network traffic. In some embodiments, the network device may transmit a packet response to the computing device that includes the connection identifier. Further, the computing device, based on receiving the packet response that includes the connection identifier, may include the connection identifier in subsequent packets of network traffic. In some embodiments, the packet may include a flag indicating that a connection identifier should not be generated for the packet and the network device may route the packet without generating a connection identifier. Therefore, the network device may identify and/or generate a connection identifier for particular packets of network traffic, while not identifying and/or generating a connection identifier for other packets of network traffic.

To generate the connection identifier, the network device may perform load balancing to identify a particular network host and/or a particular computing resource for the packet. For example, the network device may perform a packet hashing process to map the packet to a particular network host and/or a particular computing resource. The packet hashing process may approximately distribute packets of network traffic equally across the pool of computing resources and/or across the pool of network hosts. For example, the packet hashing process may be Equal Cost Multipath ("ECMP") hashing or any other type of hashing. In some embodiments, the network device may perform load balancing to identify an additional network host and may distribute the packet to an additional network device associated with the additional network host. Further, the network device may encapsulate the packet prior to distributing the packet and may route the encapsulated packet to the additional network device. The additional network device may receive the packet (or the encapsulated packet) and may perform a load balancing process to select a computing resource. Further, the additional network device may generate the connection identifier based on the selected network host and the selected computing resource and may add the connection identifier to the packet. Therefore, the network device may route the packet (e.g., an encapsulated packet) to an additional network device, and the additional network device may identify a particular network host (e.g., a host identifier) and a particular computing resource (e.g., a worker identifier) for the packet.

Therefore, either a network device receiving the packet or a different network device (e.g., an additional network device) may generate the connection identifier. To generate the connection identifier, the network device (or the additional network device) may identify a particular key (e.g., a digital key). The network device may identify the key for signing the connection identifier. The key may be distributed across a pool of network devices (e.g., the network device, the additional network device, and/or other network devices). The key may include a timestamp (e.g., appended to the end of the key). The timestamp may indicate the time that the particular key was generated. The key may be periodically or aperiodically updated and distributed to the network devices. For example, the key may be periodically updated every hour, every two hours, etc. The system may include a key distribution system that updates the key and distributes the key across the pool of network devices. Based on identifying the key (e.g., a most up-to-date key), the network device can sign and generate the connection identifier.

As subsequent packets of network traffic are received by the network device, the network device can determine whether the packets contain connection identifiers. As discussed above, if the network device determines that a packet does not contain a connection identifier, the network device may perform a load balancing process and generate a connection identifier for the particular packet.

To validate the security and/or authenticity of a particular connection identifier, if the network device determines that a packet does contain a connection identifier, the network device may confirm whether the connection identifier is a valid connection identifier (e.g., signed using an up-to-date key). Therefore, the network device may identify a key (e.g., the most up-to-date key) and may verify whether the connection identifier is signed using the key. If the network device determines the connection identifier was not signed using the key, the network device may perform a load balancing process and generate a new connection identifier for inclusion in the particular packet using the key. In some embodiments, if the network device determines the connection identifier was not signed using the key (e.g., was signed using an unrecognized key or was not signed), the network device may drop the packet. Therefore, the network device can determine whether a packet contains a connection identifier and verify the connection identifier.

Based on identifying the connection identifier, the network device may obtain an identifier of the particular network host identified by the connection identifier and an identifier of the particular computing resource identified by the connection identifier. The network device may determine whether the network host identified by the connection identifier corresponds to the network host of the network device. If the network host identified by the connection identifier is not the network host of the network device, the network device can encapsulate the packet to generate an encapsulated packet and may route the encapsulated packet to an additional network device on the network host identified by the connection identifier. The additional network device may receive the encapsulated packet and determine that the encapsulated packet has been encapsulated. Based on determining that the encapsulated packet has been encapsulated, the additional network device may determine that the packet cannot be rerouted to an additional network host. Instead, the additional network device may identify the connection identifier from the encapsulated packet. Further, the additional network device may parse the connection identifier to identify an identifier of the computing resource. Based on identifying the identifier of the computing resource, the network device may route the packet to the computing resource identified by the connection identifier.

If the network host identified by the connection identifier is the network host of the network device, the network device may not encapsulate the packet and route the encapsulated packet to an additional network device. Instead, the network device may identify the connection identifier from the packet. Further, the network device may parse the connection identifier to identify an identifier of the computing resource. Based on identifying the identifier of the computing resource, the network device may route the packet to the computing resource identified by the connection identifier.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments herein described.

FIG. 1 illustrates an example environment 100 in which network devices 104A, 104B may be implemented according to some embodiments, enabling packets of network traffic to be routed in a stateful manner. The example environment 100 may include one or more network hosts 102A, 102B that exist within distinct networks 108A and 108B (each a respective network environment), one or more network devices 104A and 104B, and one or more client or user computing devices 106A and 106B.

The environment 100 can be a cloud provider network (sometimes referred to simply as a "cloud"), which refers to a pool of network-accessible resources (such as compute, storage, and networking resources, applications, and services), which may be virtualized or bare-metal. The cloud can provide convenient, on-demand network access to a shared pool of configurable resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network) by way of a transit center ("TC"). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. Each network 108A and 108B illustratively represents a distinct network environment. In one embodiment, either or both networks 108A and 108B are virtualized networks logically implemented by a physical network referred to as the substrate, which includes physical network hardware such as routers, switches, network address translators ("NATs"), and so on, as well as the physical connections among the devices. For example, either or both networks 108A and 108B may represent a virtual private network environment (or "VPE"). Generally described, a VPE can represent a virtualized computing network (hosted by a host device or multiple host devices on a physical network) that enables devices connected (or "inside") the VPE to communicate as if they were connected to one another via a physical local area network (LAN). VPEs may in some instances be referred to as "virtual private clouds" ("VPCs"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the resources that comprise the VPC), and transit paths. A provider of the substrate network may enable users to configure and manage VPEs on the substrate network.

Each network 108A and 108B can logically include one or more hosts 102A, 102B, which represent computing devices operating within the network. Network hosts 102A, 102B may be physical devices, or logical devices implemented on underlying physical computing devices. For example, network hosts 102A, 102B may represent virtualized devices provided by a hosted computing environment, which may also be referred to as a "cloud computing environment." Such an environment can include a number of dynamically provisioned and released resources. Unless otherwise stated, the term "host" or "network host," as used herein, is intended to refer to a computer or computing device connected to and participating in a network, including servers and clients. For avoidance of ambiguity, it is noted that the term "host" may have other meanings in other contexts. For example, in the virtualization context, a "host device" may refer to an underlying (e.g., physical) computing device that implements a virtualized computing device. The present disclosure utilizes the terms "physical host" or "virtualization host" to refer to hosts in the virtualization context, to avoid ambiguity. Accordingly, general reference to a "host" should be understood to refer to a network host, and not necessarily to a physical computing device or virtualization host. Nevertheless, it is recognized that a virtualization host may represent a network host, and vice versa.

The client or user computing devices 106A and 106B, or simply computing devices 106A and 106B, may include any network-equipped computing device, for example, desktop computers, laptops, smartphones, tablets, e-readers, gaming consoles, and the like. It will be understood that the environment 100 may include more, less, or different computing devices. A user can utilize the computing devices 106A and 106B to send packets of network traffic to the network host 102A or the network host 102B to be routed to a particular computing resource (not shown in FIG. 1) for performance of operations on the network traffic. The computing resource may be part of a pool of computing resources that each can perform particular functions or operations on network traffic. The computing resources may perform various functions, such as monitoring, firewalling, filtering, malware scanning, and so forth, on network traffic routed to a particular computing resource. The computing device 106A may send packets to the network host 102A (e.g., via the network device 104A) at a first time based on a location of the computing device 106A and the computing device 106B may send packets to the network host 102B (e.g., via the network device 104B) based on a location of the computing device 106B.

To enable communications between networks 108A and 108B, between the networks 108A and 108B and the computing devices 106A and 106B, and between the networks 108A and 108B and the computing resources (or to other networks not shown in FIG. 1, such as a wide area network (WAN) or global area network ("GAN") like the Internet), each network 108A and 108B includes a network device 104A and 104B respectively that acts as a gateway for the network 108A and 108B. Further, the network device 104A and 104B may perform load balancing operations to distribute network traffic across the network host 102A and the network host 102B and across the computing resources. Further, the network devices 104A and 104B may receive packets of network traffic and route the packets of network traffic based on a connection identifier of the packets. The network devices 104A and 104B may distribute the packets among the network devices 104A and 104B. For example, a network device 104A can redistribute a packet of network traffic to network device 104B. Therefore, the network devices 104A and 104B may send data (e.g., in the form of packets) to the other network devices, to the network hosts 102A and 102B, and/or to the computing resources.

Embodiments of the present disclosure enable the network devices 104A and 104B to receive packets of network traffic from the computing devices 106A and 106B. In some embodiments, a router (e.g., a load balancer) may perform load balancing on network traffic from the computing devices 106A and 106B. Further, the router may distribute the network traffic across the network devices 104A and 104B.

The network device 104A or 104B may receive the packets and parse the packets to determine if the packets contain a connection identifier. If the network device 104A or 104B determines that the packet does not contain a connection identifier, the network device 104A or 104B may perform load balancing to select a particular network host 102A or 102B for the packet. In some embodiments, the network device 104A or 104B can transmit the packet to a different network device (e.g., the network device 104A may transmit the packet to network device 104B) and the network device 104B may perform load balancing to select a particular network host 102A or 102B for the packet. The network device 104A or 104B may further perform load balancing to select a particular computing resource for the packet. Based on the load balancing, the network device 104A or 104B may identify a host identifier for the selected network host and a worker identifier for the selected computing resource. For example, each network host and each computing resource may be associated with a particular identifier (e.g., string of numbers, words, symbols, etc.). Further, the identifiers for each network host and each computing resource may be stored in a data store accessible by the network device 104A or 104B. The network device 104A or 104B may further generate a connection identifier that includes the host identifier and the worker identifier. Further, the network device 104A or 104B may sign the connection identifier using a key identified by the network device 104A or 104B. The network device 104A or 104B may add the connection identifier to the packet.

Further, if the network device 104A or 104B determines that the packet does contain a connection identifier, the network device 104A or 104B may parse the connection identifier to determine if the connection identifier is signed. In some embodiments, the network device 104A or 104B may parse the connection identifier to determine if the connection identifier is signed using an up-to-date key (e.g., the most up-to-date key recognized by the network device 104A or 104B). If the network device 104A or 104B determines that the connection identifier is not signed or is signed using an incorrect key, the network device 104A or 104B may generate a new connection identifier for the packet as discussed above. Further, the network device 104A or 104B may add the new connection identifier to the packet. If the network device 104A or 104B determines that the connection identifier is signed (e.g., signed using an up-to-date key), the network device 104A or 104B may identify a host identifier from the connection identifier. Using the host identifier, the network device 104A or 104B may identify network host 102A or 102B and may encapsulate the packet and route the encapsulated packet to the network device associated with the identified network host. In some cases, the network device 104A or 104B may identify the network host using the host identifier and determine that the identified network host is associated with the particular network device (e.g., network device 104A and network host 102A). Based on determining the identified network host is associated with the particular network device, the particular network device may not reroute the packet.

Therefore, a network device 104A or 104B may receive an encapsulated packet from another network device. Based on determining that the packet is encapsulated, the network device 104A or 104B may determine that the packet cannot be rerouted. For example, the network device may determine that that the packet has been encapsulated and provided by a network device and that the packet has not been provided by a router (e.g., a router using ECMP hashing). Further, the network device 104A or 104B may determine that packets cannot be encapsulated and rerouted multiple times and, based on the encapsulations of the packet, may not reroute the packet.

Further, the network device 104A or 104B receiving a packet (e.g., via load balancing or based on the host identifier) from another network device may process the packet. The network device 104A or 104B may process the packet and send a packet response directly to the computing device 106A or 106B (e.g., without sending a packet response to and/or through the network device that received the packet from the computing device 106A or 106B).

Further, the network device 104A or 104B may use the worker identifier from the connection identifier to identify a particular computing resource. The network device 104A or 104B can route the packet to the identified computing resource. Further, the network device 104A or 104B may use the worker identifier from the connection identifier to identify a particular computing resource. The network device 104A or 104B can route the packet to the identified computing resource.

Therefore, the network device 104A or 104B can receive network traffic from the computing devices 106A and 106B and route the traffic to a particular network host 102A or 102B. Further, the network device 104A or 104B can route the network traffic to a fleet of computing resources. The computing resources may perform various functions, such as monitoring, firewalling, filtering, malware scanning, and so forth. In one example, the computing resources may perform the same function and may be replicated as needed to achieve scaling based on traffic volume. In other examples, various computing resources may perform different functions, and the network devices 104A and 104B may route network traffic through multiple computing resources that perform different desired functions. The computing resources may perform the various functions on each packet of network traffic received from the network devices 104A and 104B.

Figure 2A:
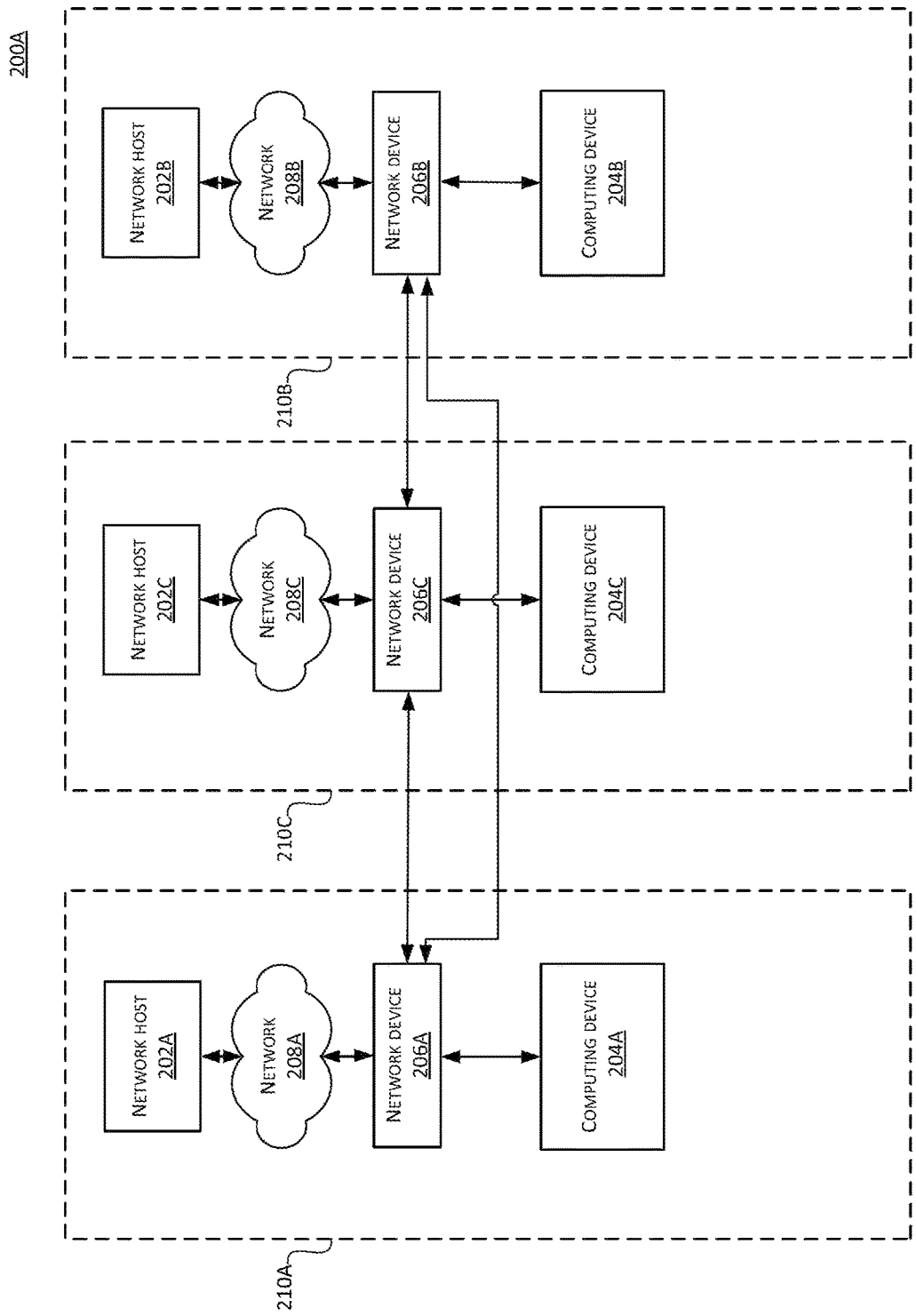
FIG. 2A depicts a schematic diagram for network devices routing traffic from computing devices to network hosts according to some embodiments.

FIG. 2A illustrates an example environment 200A according to various embodiments including multiple network hosts 202A, 202B, and 202C that exist within multiple availability zones, such as distributed across a number of regions. As shown in FIG. 2A, the network devices 206A, 206B, and 206C obtain packets generated by computing devices 204A, 204B, and 204C and pass those packets to network hosts 202A, 202B, and 202C via networks 208A, 208B, and 208C. In some embodiments, the networks devices 206A, 206B, and 206C may each be implemented within and/or by a respective network host. For example, network host 202A may implement network device 206A. The example environment 200A enables a regional view of the network devices 206A, 206B, and 206C and network hosts 202A, 202B, and 202C distributed across and contained within multiple availability zones 210A, 210B, and 210C. In some embodiments, the environment 200A includes more or less availability zones.

The networked environment 200A includes a network host 202A, a network host 202B, and a network host 202C (which illustratively exist within separate availability zones). Each availability zone 210A, 210B, and 210C may respectively include a network host 202A, 202B, or 202C, a network 208A, 208B, or 208C, a network device 206A, 206B, or 206C, and a computing device 204A, 204B, or 204C. In some embodiments, the network hosts 202A, 202B, 202C and the network devices 206A, 206B, 206C may exist within the same availability zone but may further distributed across subsets or portions of a particular availability zone. For example, the network host 202A and the network device 206A may be distributed across a first portion of an availability zone, the network host 202B and the network device 206B may be distributed across a second portion of the availability zone, and the network host 202C and the network device 206C may be distributed across a third portion of the availability zone.

As noted above, a serviced environment may require certain operations to be performed on network traffic. A computing device 204A may transmit network traffic to a network host 202A based on the computing device 204A being located in the availability zone 210A. Prior to the network host 202A obtaining the network traffic, the network device 206A may obtain the network traffic and determine whether to transmit the network traffic to the network host 202A or to transmit the network traffic to another network device (e.g., network device 206C or 206B). Similarly, the computing device 204B may transmit network traffic to a network host 202B based on the computing device 204B being located in the availability zone 210B, and the computing device 204C may transmit network traffic to a network host 202C based on the computing device 204C being located in the availability zone 210C. Prior to the network host 202B and the network host 202C obtaining the respective network traffic, the network device 206B and the network device 206C may obtain the network traffic and determine whether to transmit the network traffic to the network host 202B and the network host 202C or to transmit the network traffic to another network device.

Illustratively in FIG. 2A, the network devices 206A, 206B, and 206C may act as network gateways for transmitting the network traffic from the computing devices 204A, 204B, and 204C to network hosts 202A, 202B, and 202C. Further, the network devices 206A, 206B, and 206C may act as load balancers to approximately equally distribute network traffic among the network hosts 202A, 202B, and 202C. While described above as a component of the serviced environment of the network hosts 202A, 202B, and 202C, the network devices 206A, 206B, and 206C may be a component of other networks, such as an 'edge router' controlling traffic into the serviced environment (which edge router may exist outside of the environment) or a gateway of other serviced environments.

The environment 200A may include a number of network resources across a plurality of availability zones, each of which represents an isolated set of physical devices hosting such a zone. For example, the environment 200A may include a number of network resources in a first availability zone and a number of network resources in a second availability zone. The environment 200A may further isolate network traffic within the environment 200A from traffic external to the environment 200A. For example, the environment 200A may correspond to a specific client and/or user and include a distinct set of IP addresses. The distinct set of IP addresses may be associated with a plurality of computing resources, network gateways, etc., operating within the environment 200A.

The environment 200A is further shown as divided into a number of subnets and/or zones 210 (zones 210A, 210B, and 210C), which may also be referred to as availability zones or availability regions. Each availability zone may also correspond to a network host 202A, 202B, 202C and a network device 206A, 206B, 206C. Each zone 210A, 210B, and 210C illustratively represents a computing system that is isolated from the systems of other zones 210A, 210B, and 210C in a manner that reduces a likelihood that wide-scale events such as a natural or man-made disaster, impact operation of all (or any two) zones 210A, 210B, and 210C. For example, the components (e.g., computing devices, computing resources, etc.) of each zone 210A, 210B, and 210C may be physically isolated by distances selected to reduce a likelihood of a wide-scale event affecting performance of all (or any two) zones 210A, 210B, and 210C. Further, the components of each zone 210A, 210B, and 210C may be associated with independent electric power, and thus may be electrically isolated from resources of other zones 210A, 210B, and 210C. In some embodiments, the resources of each zone 210A, 210B, and 210C may communicate with resources of other electrically isolated zones via a network, (e.g., via transmission of electrical signals for communication rather than power). Further, the resources of each zone 210A, 210B, 210C may have independent cooling systems, independent intra-zone networking resources, etc. In some instances, zones 210A, 210B, and 210C may be further isolated by limiting operation of components between zones 210A, 210B, and 210C. For example, virtual machine instances in a zone 210A, 210B, or 210C may be limited to using storage resources, processing resources, and communication links in that zone 210A, 210B, and 210C. Restricting inter-zone cloud or network-based computing operations may limit the "blast radius" of any failure within a single zone 210A, 210B, or 210C, decreasing the chances that such a failure inhibits operation of other zones 210A, 210B, and 210C. Illustratively, services provided by the components may generally be replicated within zones, such that a client can (if they so choose) utilize the components entirely (or almost entirely) by interaction with a single zone 210A, 210B, or 210C.

As discussed above, each computing device 204A, 204B, 204C may generate network traffic and provide the network traffic to a corresponding network device 206A, 206B, 206C. Each network device 206A, 206B, 206C can receive network traffic and parse the packets of network traffic. The network device 206A, 206B, 206C can parse the network traffic to determine whether the packet of network traffic includes a connection identifier. For example, the connection identifier may include a worker identifier, a host identifier, and a signature. Based on identifying the connection identifier, the network device 206A, 206B, 206C can obtain the host identifier and identify a particular host for the packet of network traffic. Further, the network device 206A, 206B, 206C may determine whether the host identifier corresponds to host located in the same availability zone as the network device 206A, 206B, 206C. For example, the network device 206A may determine if the host identifier identifies network host 202A, the network device 206B may determine if the host identifier identifies network host 202B, and the network device 206C may determine if the host identifier identifies network host 202C. If the host identifier identifies the network host associated with the network device 206A, 206B, 206C, the network device 206A, 206B, 206C can route the packet to the network host 202A, 202B, 202C via the network 208A, 208B, 208C.

If the host identifier does not identify the network host associated with the network device 206A, 206B, 206C, the network device 206A, 206B, 206C can determine a network device associated with the network host identified by the host identifier. For example, network device 206A may determine the host identifier identifies network host 202C and may identify that network host 202C is associated with network device 206C. Further, the network device 206A, 206B, 206C can encapsulate the packet to generate an encapsulated packet and transmit the encapsulated packet to the identified network device. In some embodiments, the packet may be encapsulated using an encapsulation protocol such as IP/IP encapsulation, Generic Network Virtualization Encapsulation ("GENEVE"), Virtual Extensible LAN ("VXLAN"), Network Virtualization using Generic Routing Encapsulation ("NVGRE"), or Stateless Transport Tunneling ("STT"). Based on receiving the encapsulated packet, the identified network device may determine that the packet cannot be rerouted and may route the packet to a network host identified by the host identifier.

The network device 206A, 206B, 206C may also verify that the connection identifier and/or host identifier has been signed using a digital key. Further, the network device 206A, 206B, 206C may compare a signature of the connection identifier with the connection identifier to determine if the connection identifier is not signed. If the connection identifier has been signed using the digital key, the network device 206A, 206B, 206C may route the packet to a corresponding network host or may route the packet to another network device. If the connection identifier has not been signed using the digital key, the network device 206A, 206B, 206C may drop the packet or may generate a new connection identifier for the packet using the key.

In some embodiments, the network device 206A, 206B, 206C may determine the packet does not contain a connection identifier. Further, the network device 206A, 206B, 206C may generate a connection identifier by performing a load balancing process to identify a particular network host. The network device 206A, 206B, 206C may generate the connection identifier by adding a host identifier for the particular network host to the connection identifier and signing the connection identifier using the key. In some embodiments, the network device 206A, 206B, 206C may perform a load balancing process to select a network device 206A, 206B, 206C for generating the connection identifier and may send the packet to the network device 206A, 206B, 206C. Further, the network device 206A, 206B, 206C can add the connection identifier to the packet.

Figure 2B:
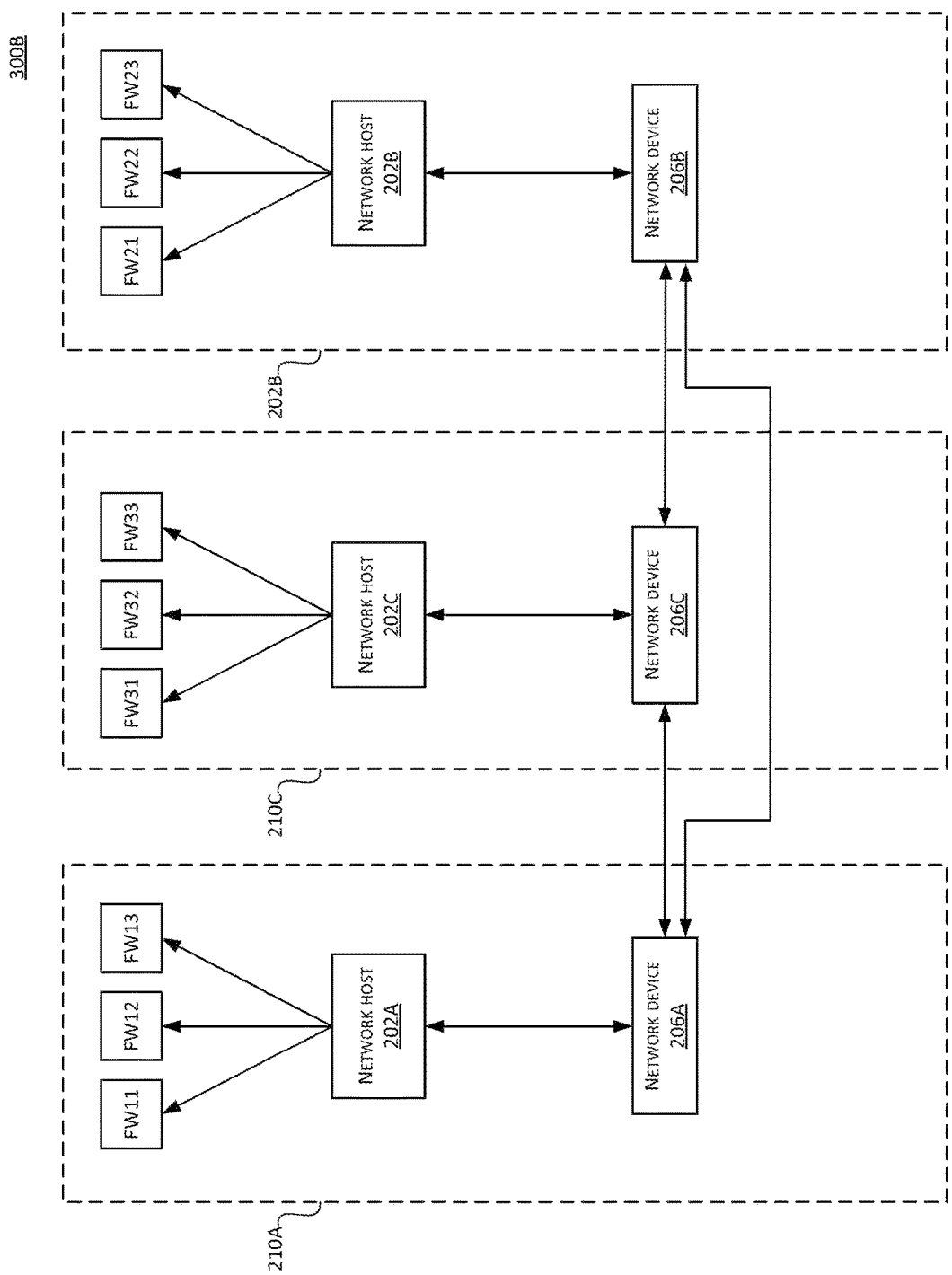
FIG. 2B depicts a schematic diagram for network devices routing traffic from network hosts to applications according to some embodiments.

FIG. 2B illustrates an example environment 200B according to various embodiments including multiple network hosts 202A, 202B, and 202C that exist within multiple availability zones, such as distributed across a number of regions. As discussed above with respect to FIG. 2A, the network hosts 202A, 202B, 202C and the network devices 206A, 206B, and 206C may be distributed across availability zones 210A, 210B, 210C. Further, each of the network hosts 202A, 202B, 202C may pass packets to computing resources.

Each availability zone 210A, 210B, 210C may correspond to a unique set of computing resources. For example, availability zone 210A corresponds to computing resources FW11, FW12, and FW13; availability zone 210B corresponds to computing resources FW21, FW22, and FW23; and availability zone 210 C corresponds to computing resources FW31, FW32, and FW33. In some embodiments, the environment 200B includes more or less availability zones.

As discussed above, each network host 202A, 202B, 202C may receive network traffic (e.g., network traffic originating from computing devices 204A, 204B, 204C respectively) from a corresponding network device 206A, 206B, 206C. Further, each network host 202A, 202B, 202C can use a router (e.g., the network device 206A, 206B, 206C, a load balancer, a different network device, etc.) to route the packets to a particular computing resource. Each router can receive network traffic and parse the packets of network traffic. The router can parse the network traffic to identify a connection identifier. For example, the connection identifier may include a worker identifier, a host identifier, and a signature. Based on identifying the connection identifier, the router can obtain the worker identifier and identify a particular computing resource for the packet of network traffic. Therefore, the router can determine which computing resource should receive the particular packet and route the packet to the particular computing resource.

In some embodiments, the router may determine the packet does not contain a connection identifier. Further, the router may generate a connection identifier and/or a worker identifier by performing a load balancing process to identify a particular computing resource based on load balancing the traffic among the computing resources. The router may generate the connection identifier by adding a worker identifier for the particular computing resource to the connection identifier and signing the connection identifier using the key. Further, the router can add the connection identifier to the packet.

Figure 3A:
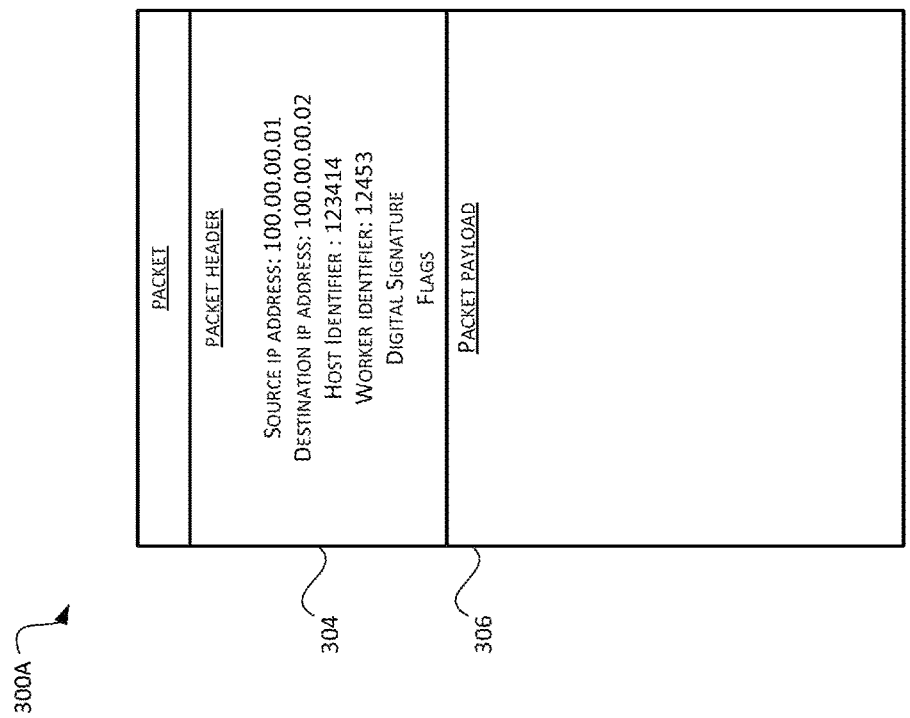
FIG. 3A is a pictorial diagram depicting an encapsulated packet in accordance with aspects of the present disclosure.

FIG. 3A illustrates a pictorial diagram depicting an example packet 300A in accordance with aspects of the present disclosure. The packet 300A may correspond to a packet of active network traffic between a source (e.g., a computing device) and a destination (e.g., a network host). The packet 300A includes a connection identifier (e.g., including a host identifier, a worker identifier, and a signature) to enable transmission of the packet between network devices. The computing device and/or the network device may generate the connection identifier and add the connection identifier to the packet. The packet 300A may include a packet header 304 and a packet payload 306. One or more layers or portions of the packet 300A may correspond to control data, and one or more layers of the packet 300A may correspond to user data. In some embodiments, the packet 300A may include additional fields or layers such as a user datagram protocol layer, an Ethernet layer, or a trivial file transfer protocol layer. In some embodiments, the packet 300A may be an encapsulated packet 300A.

The packet header 304 may include IP information associated with the packet. For example, the packet header 304 may include a source IP address corresponding to the source of the packet and a destination IP address corresponding to the destination of the packet. The packet header 304 may further include a designation of one or more of information identifying a particular flow of network traffic, a source port, a destination port, or flags. The packet header 304 may further include additional packet information. The additional packet information may correspond to TCP information associated with the packet 300A. In the example of FIG. 3A, the packet header 304 includes field values for each of a source IP address, a destination IP address, a host identifier, a worker identifier, a digital signature, and one or more flags.

The packet payload 306 may correspond to user data to be sent from the source to the destination. For example, the packet payload 306 may correspond to user communications, user commands, or other user data. The packet payload 306 may be generated by one or more applications associated with the source. In some embodiments, the size of the packet payload 306 may be limited by various network protocols. For example, the size of the packet payload 306 may be limited to a discrete number of bytes. Therefore, the packet payload 306 may include a plurality of information to be delivered to the destination.

To generate a connection identifier, the computing device and/or the network device may add connection information (e.g., host information, worker information, a digital signature, etc.) to the packet 300A. The packet header 304 may include one or more fields of connection information. The connection information may include a host identifier identifying a particular network host and/or a worker identifier identifying a particular computing resource. Further, the connection information may include a digital signature generated by signing the connection information with a key.

Figure 3B:
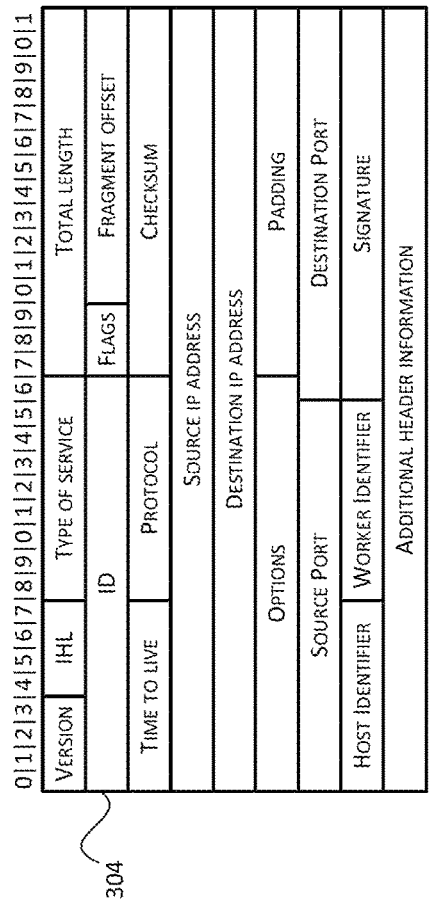
FIG. 3B is a pictorial diagram depicting a header of an encapsulated packet in accordance with aspects of the present disclosure.

FIG. 3B illustrates a pictorial diagram depicting an example packet header 300B of an example encapsulated packet in accordance with aspects of the present disclosure. Illustratively, the example packet header 300B can be a packet header 304 of the packet 300A as illustrated in FIG. 3A. Returning to FIG. 3B, the information included within the packet header 300B may correspond to one or more fields that are used to identify a particular packet. Therefore, the packet header 300B can correspond to one or more fields that may be used to identify various information associated with the packet.

The packet header 300B may include a plurality of field values. Each field value may correspond to a particular field. For example, the packet header 300B may include a field "source port" and a field value "12453." In some implementations, the packet header 300B may not include certain fields. For example, the packet header may not include a "source port" field or a "destination port" field. Further, the number of fields within a certain packet may depend on the protocol being implemented with respect to the particular packet. In the example of FIG. 3B, the packet header 300B includes a user datagram protocol ("UDP") header and an internet protocol version 4 ("IPV4") header. In some embodiments, the packet header 300B may include more, less, or different headers (e.g., an internet protocol version 6 ("IPV6") header).

The plurality of field values may be separated within the packet header 300B. In some implementations, the plurality of field values may correspond to certain bit ranges. For example, a given field value may correspond to a given range of bits within the packet header 300B. Further, a first field value may correspond to a first row and bits zero through three; a second field value may correspond to a first row and bits four through seven; etc. In other implementations, the plurality of field values may correspond to certain associated fields. For example, a given field may correspond to "source port" and a given field value "12453." In order to determine a particular field value, the packet header 300B may be parsed based upon bit ranges, the one or more fields, or other packet information. Therefore, the packet header 300B may be parsed to identify certain field values of the packet.

In the example of FIG. 3B, the packet header 300B includes a plurality of field values. Each field value may be identified based upon a row and a range of bits or based on an associated field. For example, the plurality of field values includes a field value that corresponds to row one and bits zero through three and corresponds to a field "version." In the example of FIG. 3B, the plurality of field values includes field values distributed across rows one through eight. Further, the plurality of field values include field values that correspond to the fields "version," internet header length ("IHL"), "type of service," "total length," identifier ("ID"), "flags," "fragment offset," "time to live," "protocol," "checksum," "source IP address," "destination IP address," "options," "padding," "source port," "destination port," "host identifier," "worker identifier," "signature," and "additional header information." In some embodiments, more or less fields may be included in the packet header 300B. Therefore, the packet header 300B may include any number of field values that are used to identify a particular packet and a particular flow of network traffic.

In some cases, the network device and/or the computing device may add additional information identifying the connection identifier to the packet header 300B as additional header information.

Figure 4:
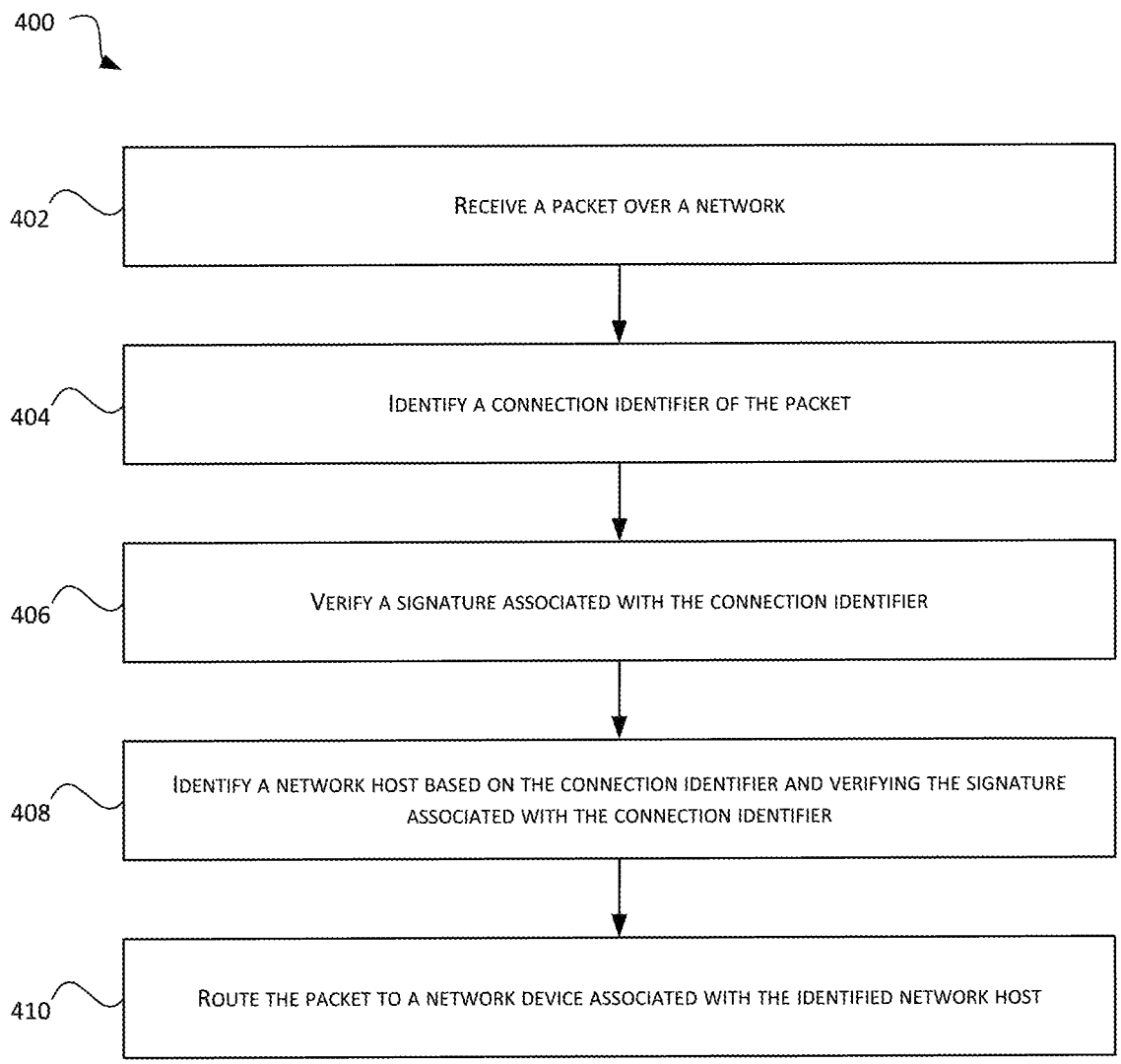
FIG. 4 is a flowchart of an example routine for receiving a packet and routing the packet to a network device according to some embodiments.

FIG. 4 is a flowchart of an example routine for transmitting a packet between network devices using a connection identifier. The routine 400 may be carried out by the network devices 104A, 104B of FIG. 1.

The routine 400 begins at block 402 where the first network device receives a packet over a network. For example, the first network device may receive a packet of network traffic from a computing device. The packet may be an IP packet. In some embodiments, the first network device may receive the packet from a virtualized computing environment.

At block 404, the first network device identifies a connection identifier of the packet. The first network device may parse the packet to identify the connection identifier. The connection identifier may include a host identifier (e.g., a one byte host identifier) identifying a particular network host associated with a particular network device and a worker identifier (e.g., a one byte worker identifier) identifying a worker node (e.g., a computing resource). The packet may include a signature. For example, the connection identifier may be signed with a key to generate the signature.

The first network device may determine that a particular packet does not include a connection identifier. The first network device may perform a load balancing operation for the packet to determine to which particular network host to send the packet. In some embodiments, the first network device may generate a connection identifier that identifies the selected network host and add the connection identifier to the packet. In other embodiments, the first network device may transmit the packet to a different network device (e.g., a network device in the same availability zone or region as the network host), and the different network device may generate the connection identifier and add the connection identifier to the packet. Further, the first network device and/or the different network device may sign the connection identifier using a particular key, as discussed below.

The first network device may further identify a key associated with the first network device. The key may be shared by a plurality of network devices. For example, the key may be periodically or aperiodically distributed to the network devices and updated by a key distribution system. The key may include a time stamp that is appended to the end of the key. The time stamp may identify a time of generation of the key. The key may be associated with a main key (e.g., a durable main key) and various sub-keys (e.g., derived keys). For example, the main key may be a four bit value. The various sub-keys may be generated from the main key. The main key may be used for a time period (e.g., twelve hours) and the various sub-keys may be used for a subset of the time period (e.g., two minutes). The first network device may identify the main key using a main key identifier. Further, using the main key identifier and a time identifier (e.g., a time associated with the packet), the first network device may identify a particular sub-key. After expiration of the time period (or the subset of the time period), the network devices may receive an updated key (e.g., an updated main key identifier) and replace the key with the updated key.

At block 406, the first network device verifies the signature associated with the connection identifier. The first network device may verify the signature using the key. In some embodiments, the first network device may verify that the signature associated with the connection identifier matches an updated key (e.g., a most up-to-date recognized by the first network device). In some embodiments, the first network device may determine that the signature does not match the key (e.g., an updated key). Based on determining that the signature does not match the key, the first network device may generate an updated signature and/or an updated connection identifier. In some embodiments, the first network device (or another network device) may sign the connection identifier with an updated signature. In other embodiments, the first network device (or another network device) may generate a new connection identifier with the updated signature. For example, the first network device may perform a load balancing operation for the packet to determine to which particular network host to send the packet. In some embodiments, the first network device may generate a connection identifier that identifies the selected network host and add the connection identifier to the packet. In other embodiments, the first network device may transmit the packet to a different network device (e.g., a network device in the same availability zone or region as the network host), and the different network device may generate the connection identifier and add the connection identifier to the packet. In some embodiments, based on determining that the signature does not match the key, the first network device may drop the packet.

At block 408, the first network device identifies a network host based on the connection identifier and verifying the signature associated with the connection identifier. For example, the first network device may identify a first network host associated with the first network device or a second network host associated with a second network device.

At block 410, the first network device routes the packet to the network device associated with the identified network host. For example, the first network device can route the packet to the second network device. In some embodiments, the first network device may determine the host identifier is associated with the first network host and may not route the packet to a different network device. Further, the first network device can identify a worker node using a worker identifier from the connection identifier and may route payload information of the packet (or the packet) to the worker node.

In some embodiments, the first network device may determine the identified network host is located in a different availability zone or region from the first network device. Prior to routing the packet, the first network device may encapsulate the packet based on determining that the identified network host is located in a different availability zone or region from the first network device. For example, the first network device may encapsulate the packet using an IP to IP encapsulation protocol. The encapsulated packet may include the connection identifier and payload information from the packet. Further, the first network device can route the encapsulated packet to the second network device.

The second network device may receive the encapsulated packet and parse the encapsulated packet to identify the connection identifier. In some embodiments, the second network device may verify the signature using the key (e.g., the key may be shared between multiple network devices). In other embodiments, the second network device may not verify the signature based on determining the packet is encapsulated. Further, the second network device can identify a worker node using a worker identifier from the connection identifier and may route the payload information of the packet to the worker node.

It will be understood that any network device may route any packet of network traffic to any other network device based on the connection identifier. For example, a third network device may route network traffic to the first network device and/or the second network device may route network traffic to the first network device. Further, each network device may route network traffic from any computing device to any other network device. For example, the first network device may route network traffic from a first computing device and a second computing device to the second network device.

Figure 5:
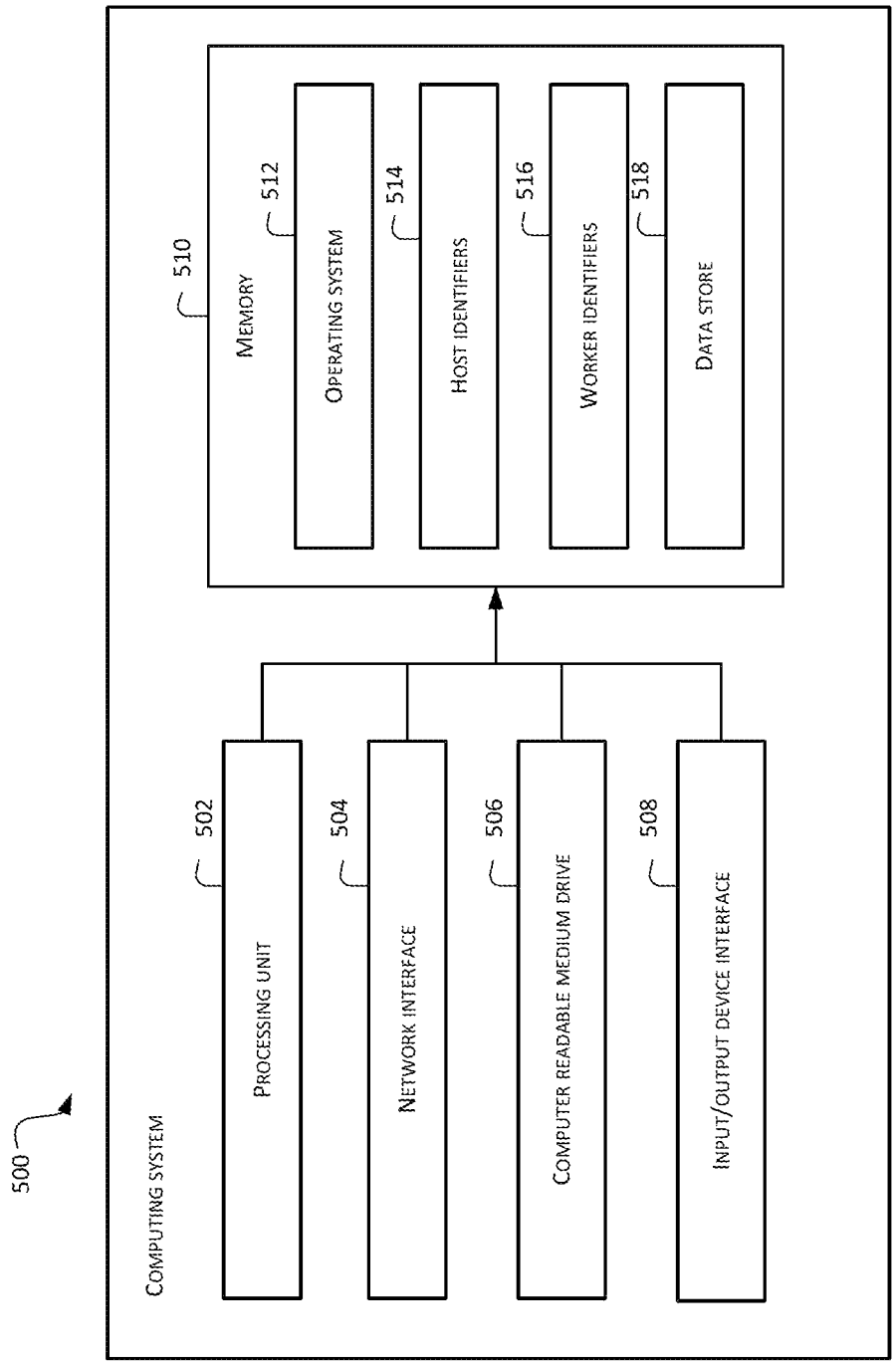
FIG. 5 shows an example computing device that may be used to implement aspects of the present disclosure.

FIG. 5 is a block diagram illustrating an example computing system, according to various embodiments. Computing system 500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. In some embodiments, the computing system 500 may correspond to network device 104A or network device 104B. The computing system 500 may include: one or more processing units 502, such as physical central processing units ("CPUs"); one or more network gateways 504, such as a network gateway cards ("NICs"); one or more computer-readable medium drives 506, such as a high density disk ("HDDs"), solid state drives ("SDDs"), flash drives, and/or other persistent non-transitory computer-readable media; an input/output device gateway 508, such as an IO gateway in communication with one or more microphones; and one or more computer-readable memories 510, such as random access memory ("RAM") and/or other volatile non-transitory computer-readable media.

In various embodiments, computing system 500 may be a uniprocessor system including one processing unit 502, or a multiprocessor system including several processing units 502 (e.g., two, four, eight, or another suitable number). Processing units 502 may be any suitable processors capable of executing instructions. For example, in various embodiments, processing units 502 may be general-purpose or embedded processors implementing any of a variety of instruction set architectures ("ISAs"), such as the x86, PowerPC, SPARC, or MIPS ISAs, or any other suitable ISA. In multiprocessor systems, each of the processing units 502 may commonly, but not necessarily, implement the same ISA. The computing system 500 also includes one or more network communication devices (e.g., network gateway 504) for communicating with other systems and/or components over a communications network (e.g., Internet, LAN, etc.).

In one embodiment, I/O device gateway 508 may coordinate I/O traffic between the processing unit 502, computer-readable memory 510, and any peripheral devices in the system, including through network gateway 504 or other peripheral gateways. In some embodiments, I/O device gateway 508 may perform any necessary protocol, timing or other data transformations to convert data signals from one component (e.g., computer-readable memory 510) into a format suitable for use by another component (e.g., processing unit 502). In some embodiments, I/O device gateway 508 may include support for devices attached through various types of peripheral buses, such as a variant of the Peripheral Component Interconnect ("PCI") bus standard or the Universal Serial Bus ("USB") standard, for example. In some embodiments, the function of I/O device gateway 508 may be split into two or more separate components, such as a north bridge and a south bridge, for example. Also, in some embodiments, some or all of the functionality of I/O device gateway 508, such as a gateway to computer-readable memory 510, may be incorporated directly into processing unit 502.

The network gateway 504 may allow data to be exchanged between computing system 500 and other devices attached to a network, such as other computer systems, for example. In addition, network gateway 504 may allow communication between computing system 500 and various I/O devices and/or remote storage (which may represent, for example, data stores 518). Input/output devices may, in some embodiments, include one or more display terminals, keyboards, keypads, touchpads, scanning devices, voice, or optical recognition devices, or any other devices suitable for entering or retrieving data by one or more computing systems 500. Multiple input/output devices may be present in computing system 500 or may be distributed on various nodes of a distributed system that includes computing system 500. In some embodiments, similar input/output devices may be separate from computing system 500 and may interact with one or more nodes of a distributed system that includes computing system 500 through a wired or wireless connection, such as over network gateway 504. Network gateway 504 may commonly support one or more wireless networking protocols (e.g., Wi-Fi/IEEE 802.11, or another wireless networking standard). However, in various embodiments, network gateway 504 may support communication via any suitable wired or wireless general data networks, such as other types of Ethernet networks, for example. Additionally, network gateway 504 may support communication via telecommunications/telephony networks such as analog voice networks or digital fiber communications networks, via storage area networks such as Fibre Channel SANs, or via any other suitable type of network and/or protocol.

The processing unit 502 can receive information and instructions from other computing systems or services via the network gateway 504. The network gateway 504 can also store data directly to the computer-readable memory 510. The processing unit 502 can communicate to and from the computer-readable memory 510, execute instructions and process data in the computer-readable memory 510, etc.

The computer-readable memory 510 may include computer program instructions that the processing unit 502 executes in order to implement one or more embodiments. The computer-readable memory 510 can store an operating system 512 that provides computer program instructions for use by the processing unit 502 in the general administration and operation of the computing system 500. The computer-readable memory 510 can further include computer program instructions and other information for implementing aspects of the present disclosure. For example, in one embodiment, the computer-readable memory 510 may include host identifiers 514. As another example, the computer-readable memory 510 may include worker identifiers 516. In some embodiments, the computer-readable memory 510 may include a key.

It will be understood that other applications may be stored in the computer-readable memory 510. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the computer-readable memory 510 and are executable by the processing unit 502. In this respect, the term "executable" means a program file that is in a form that can ultimately be run by the processing unit 502. Examples of executable programs may be, for example, a compiled program that can be translated into machine code in a format that can be loaded into a random access portion of the computer-readable memory 510 and run by the processing unit 502, source code that may be expressed in proper format such as object code that is capable of being loaded into a random access portion of the computer-readable memory 510 and executed by the processing unit 502, or source code that may be interpreted by another executable program to generate instructions in a random access portion of the computer-readable memory 510 to be executed by the processing unit 502, etc. An executable program may be stored in any portion or component of the computer-readable memory 510 including, for example, random access memory ("RAM"), read-only memory ("ROM"), hard drive, solid-state drive, USB flash drive, memory card, optical disc such as compact disc ("CD") or digital versatile disc ("DVD"), floppy disk, magnetic tape, or other memory components. It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have a gateway described in a machine-processable format, such as the Web Services Description Language ("WSDL"). Other systems may interact with the network-based service in a manner prescribed by the description of the network-based service's gateway. For example, the network-based service may define various operations that other systems may invoke, and may define a particular application programming gateway ("API") to which other systems may be expected to conform when requesting the various operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In various embodiments, a network-based service may be requested or invoked through the use of a message that includes parameters and/or data associated with the network-based services request. Such a message may be formatted according to a particular markup language such as Extensible Markup Language ("XML"), and/or may be encapsulated using a protocol such as Simple Object Access Protocol ("SOAP"). To perform a network-based services request, a network-based services client may assemble a message including the request and convey the message to an addressable endpoint (e.g., a Uniform Resource Locator ("URL")) corresponding to the network-based service, using an Internet-based application layer transfer protocol such as Hypertext Transfer Protocol ("HTTP").

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions. Further, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computing system comprising:
   a plurality of network hosts, wherein each network host is associated with a respective network device, wherein a first network host of the plurality of network hosts is associated with a first network device, and wherein the first network device is configured to:
   receive a packet of network traffic over a network from a computing device;
   parse the packet to identify a connection identifier, the connection identifier comprising a host identifier and a worker identifier, wherein the host identifier identifies a second network host of the plurality of network hosts associated with a second network device, and wherein the packet comprises a signature;
   identify a key associated with the first network device;
   verify the signature based on the key;
   identify the second network host using the host identifier based on verifying the signature by the first network device;
   encapsulate the packet to generate an encapsulated packet based on identifying the second network host, wherein the encapsulated packet comprises the connection identifier and payload information of the packet; and
   route the encapsulated packet to the second network device;
   wherein the second network device is configured to:
   receive the encapsulated packet;
   parse the encapsulated packet to identify the connection identifier;
   identify the key, wherein the key is associated with the first network device and the second network device;
   verify the signature based on the key;
   identify a worker node using the worker identifier based on verifying the signature by the second network device; and
   route the payload information of the packet to the worker node.

2. The computing system of claim 1, wherein the first network device is further configured to:
   receive an updated key; and
   replace the key with the updated key.

3. The computing system of claim 2, wherein the updated key is associated with an updated signature, and wherein the first network device is further configured to:
   receive a second packet of network traffic over the network from the computing device;
   determine the second packet does not comprise the updated signature; and
   perform a load-balancing operation for the second packet to determine a selected network host for the second packet from the plurality of network hosts, wherein at least one of the first network device or the second network device is configured to:
   generate a second connection identifier for the second packet, the second connection identifier identifying the selected network host; and
   add the second connection identifier to the second packet.

4. The computing system of claim 1, wherein the first network device is further configured to:
   receive a second packet of network traffic over the network from the computing device;
   determine the second packet does not comprise the signature; and
   perform a load-balancing operation for the second packet to determine a selected network host for the second packet from the plurality of network hosts, wherein at least one of the first network device or the second network device is configured to:
   generate a second connection identifier for the second packet, the second connection identifier identifying the selected network host; and
   add the second connection identifier to the second packet.

5. A computer-implemented method comprising:
   receiving, by a first network device associated with a first network host, a packet of network traffic over a network from a computing device;
   parsing, by the first network device, the packet to identify a connection identifier, the connection identifier comprising a host identifier, wherein the host identifier identifies a second network host, and wherein the packet comprises a signature;
   identifying, by the first network device, a key associated with the first network device;
   verifying, by the first network device, the signature based on the key;
   identifying, by the first network device, a second network host based on the host identifier and verifying the signature;
   encapsulating, by the first network device, the packet to generate an encapsulated packet based on identifying the second network host, wherein the encapsulated packet comprises the connection identifier of the packet and payload information of the packet; and routing, by the first network device, the encapsulated packet to a second network device associated with the second network host.

6. The computer-implemented method of claim 5, wherein the packet comprises an internet protocol packet.

7. The computer-implemented method of claim 5, wherein the connection identifier further comprises a worker identifier.

8. The computer-implemented method of claim 7 further comprising:
receiving, by the second network device, the encapsulated packet;
parsing, by the second network device, the encapsulated packet to identify the connection identifier;
identifying, by the second network device, the key, wherein the key is associated with the first network device and the second network device;
verifying, by the second network device, the signature based on the key;
identifying, by the second network device, a worker node based on the worker identifier and verifying the signature by the second network device; and
routing, by the second network device, the payload information of the packet to the worker node.

9. The computer-implemented method of claim 7 further comprising:
receiving, by the second network device, the encapsulated packet;
determining, by the second network device, the payload information is encapsulated by the encapsulated packet;
parsing, by the second network device, the encapsulated packet to identify the connection identifier;
identifying, by the second network device, a worker node based on the worker identifier; and
routing, by the second network device, the payload information of the packet to the worker node based on determining the payload information is encapsulated by the encapsulated packet.

10. The computer-implemented method of claim 5 further comprising:
receiving, by the first network device, a second packet of network traffic over a second network from a second computing device;
parsing, by the first network device, the second packet to identify the connection identifier of the packet, wherein the second packet comprises the signature;
identifying, by the first network device, the key;
verifying, by the first network device, the signature based on the key;
identifying, by the first network device, the second network host based on the host identifier and verifying the signature;
encapsulating, by the first network device, the second packet to generate a second encapsulated packet based on identifying the second network host, wherein the second encapsulated packet comprises the connection identifier and payload information of the second packet; and
routing, by the first network device, the second encapsulated packet to the second network device.

11. The computer-implemented method of claim 5 further comprising:

receiving, by the first network device, a second packet of network traffic over a second network from a second computing device;
parsing, by the first network device, the second packet to identify a second connection identifier, the second connection identifier comprising a second host identifier and a worker identifier, wherein the second packet comprises the signature;
identifying, by the first network device, the key;
verifying, by the first network device, the signature based on the key;
determining, by the first network device, the second host identifier corresponds to the first network host;
identifying, by the first network device, a worker node based on the worker identifier; and
routing, by the first network device, the second packet to the worker node based on determining the second host identifier corresponds to the first network host.

12. The computer-implemented method of claim 5 further comprising:
receiving, by a third network device associated with a third network host, a second packet of network traffic over a second network from a second computing device;
parsing, by the third network device, the second packet to identify a second connection identifier of the second packet, the second connection identifier comprising a second host identifier, wherein the second packet comprises the signature;
identifying, by the third network device, the key;
verifying, by the third network device, the signature based on the key;
identifying, by the third network device, the first network host based on the second host identifier and verifying the signature by the third network device;
encapsulating, by the third network device, the second packet to generate a second encapsulated packet based on identifying the first network host, wherein the second encapsulated packet comprises the second connection identifier and second payload information of the second packet; and
routing, by the third network device, the second encapsulated packet to the first network device associated.

13. The computer-implemented method of claim 5 further comprising:
receiving, by a third network device associated with a third network host, a second packet of network traffic over a second network from a second computing device;
parsing, by the third network device, the second packet to identify a second connection identifier of the packet, the second connection identifier comprising a second host identifier, wherein the second packet comprises the signature;
identifying, by the third network device, the key;
verifying, by the third network device, the signature based on the key;
identifying, by the third network device, the second network host based on the host identifier and verifying the signature by the third network device;
encapsulating, by the third network device, the second packet to generate a second encapsulated packet based on identifying the second network host, wherein the second encapsulated packet comprises the second connection identifier and second payload information of the second packet; and routing, by the third network device, the second encapsulated packet to the second network device.

14. The computer-implemented method of claim 5, wherein the connection identifier is signed with the key to generate the signature.

15. The computer-implemented method of claim 5, wherein the key is shared by a plurality of network devices.

16. The computer-implemented method of claim 5 further comprising:
- receiving, by the first network device, a second packet of network traffic over a second network from a second computing device;
- parsing, by the first network device, the second packet to identify a second connection identifier, wherein the second packet comprises a second signature;
- identifying, by the first network device, the key;
- determining, by the first network device, the second signature does not match the key; and
- dropping, by the first network device, the second packet, based on determining the second signature does not match the key.

17. A system comprising:
- a first network device associated with a first network host, wherein the first network device is configured to at least:
  - receive a packet of network traffic over a network from a computing device;
  - parse the packet to identify a connection identifier, the connection identifier comprising a signature and a host identifier, wherein the host identifier identifies a second network host;
  - verify the signature;
  - identify the second network host based on the host identifier and verifying the signature;
  - encapsulate the packet to generate an encapsulated packet based on identifying the second network host, wherein the encapsulated packet comprises the connection identifier of the packet and payload information of the packet; and
  - route the encapsulated packet to a second network device associated with the second network host.

18. The system of claim 17 further comprising the second network device, wherein the second network device is configured to at least:
- receive the encapsulated packet from the first network device;
- determine the encapsulated packet comprises encapsulated data; and
- route the payload information of the packet to a worker node based on determining the encapsulated packet comprises encapsulated data.

19. The system of claim 17, wherein the first network device is further configured to at least:
- receive a second packet of network traffic over the network from the computing device;
- determine the second packet does not comprise the signature; and
- perform a load-balancing operation for the second packet to determine a selected network host for the second packet, wherein the selected network host is the first network host or the second network host, and wherein at least one of the first network device or the second network device is configured to at least:
  - generate a second connection identifier for the second packet, the second connection identifier identifying the selected network host; and
  - add the second connection identifier to the second packet.

20. The system of claim 17, wherein to verify the signature, the first network device is further configured to at least verify the signature using a key, wherein the key is shared by a plurality of network devices.

* * * * *